United States Patent [19]

Keith et al.

[11] 4,206,087
[45] * Jun. 3, 1980

[54] CATALYST FOR REDUCING POLLUTANTS IN WASTE GAS STREAMS AND PROCESS FOR PREPARING THE CATALYST

[75] Inventors: Carl D. Keith, Summit; John J. Mooney, Wyckoff, both of N.J.; Robert E. Kenson, Guilford, Conn.; Daniel L. Bair, Roselle Park, N.J.

[73] Assignee: Engelhard Minerals & Chemicals Corporation, Iselin, N.J.

[*] Notice: The portion of the term of this patent subsequent to Feb. 19, 1997, has been disclaimed.

[21] Appl. No.: 757,174

[22] Filed: Jan. 6, 1977
(Under 37 CFR 1.47)

[51] Int. Cl.$^2$ .................. B01J 21/04; B01J 23/10; B01J 23/40; B01J 23/74
[52] U.S. Cl. .................. 252/462; 423/213.2; 423/213.5; 252/477 R
[58] Field of Search ............. 252/466 PT, 477 R, 462, 252/466 B; 423/213.5

[56] References Cited

U.S. PATENT DOCUMENTS

| | | | |
|---|---|---|---|
| 3,565,830 | 2/1971 | Keith et al. | 252/477 R |
| 3,741,725 | 6/1973 | Graham | 423/213.7 |
| 3,839,224 | 10/1974 | Yonehara et al. | 252/477 R |
| 3,914,376 | 10/1975 | Barker | 423/213.5 |
| 3,931,050 | 1/1976 | Asano et al. | 252/462 X |

*Primary Examiner*—W. J. Shine

[57] ABSTRACT

Macrosized catalysts suitable for promoting chemical reactions, especially to reduce pollutants in waste gas streams such as automobile exhaust, are described. The catalysts have one or more metal components, especially a platinum group metal component, as a catalytic promoter combined with a high surface area, refractory oxide support. Alumina is added to the macrosize catalyst to provide protection against poisoning by extraneous materials such as lead, zinc, other metals, sulfur or phosphorus with which the catalysts may come in contact during use. These catalysts may have a relatively catalytically-inactive carrier, especially a monolithic carrier which may be of the honeycomb type.

34 Claims, No Drawings

CATALYST FOR REDUCING POLLUTANTS IN WASTE GAS STREAMS AND PROCESS FOR PREPARING THE CATALYST

The present invention relates to macrosize catalytic compositions suitable for promoting chemical reactions, and to methods for preparing such catalysts. More particularly, the invention concerns macrosize compositions having good catalytic activity and increased resistance to poisoning by extraneous materials such as lead, zinc, other metals, sulfur or phosphorus with which the catalysts may come in contact during use. Combating the poisoning effects of one or both of lead and phosphorus is of particular concern. The catalysts contain one or more catalytically-active, promoting metal components combined with a high surface area, refractory oxide support, and we have found that the addition of alumina to the macrosize catalysts provides protection against such poisoning without unduly detracting from the activity or other desirable characteristics of the catalysts. Preferably, the promoting metal component of the catalysts contains one or more of the platinum group metals. The catalysts may have a relatively catalytically-inactive carrier, especially a monolithic carrier which may be in honeycomb or other form.

The catalytic compositions of the present invention can be employed to promote chemical reactions, particularly oxidation and reduction reactions, for fume, color or odor abatement or for other reasons. These reactions include the oxidation of carbonaceous materials, e.g., carbon monoxide, hydrocarbons, oxygen-containing organic compounds, and the like, to carbon dioxide and water which are relatively innocuous materials from an air pollution standpoint. Advantageously, the catalytic compositions can be used to provide essentially complete oxidation of gaseous effluents containing uncombusted or partially combusted carbonaceous fuel components such as carbon monoxide, hydrocarbons, or intermediate oxidation products composed primarily of carbon, hydrogen and oxygen. The effluents may be of various types such as internal combustion engine exhausts, industrial plant gases, e.g., enameling fumes, asphalt plant stack gases, and the like.

The catalytic compositions of this invention may also be used to enhance other reactions such as reduction reactions. These systems include the reduction of nitrogen oxides which may appear in, for instance, internal combustion engine exhaust or other effluent gases such as tail gases from nitric acid plants. Also, the catalysts may serve to promote both oxidation and reduction reactions simultaneously. Depending upon the catalytically-active, promoting metal components in the catalysts and the conditions of their use, the catalysts may thus serve to enhance the oxidation of hydrocarbons or carbon monoxide, while promoting the reduction of nitrogen oxides, to form less noxious materials such as carbon dioxide, nitrogen and water. The compositions of this invention may thus be so-called three-way catalysts for treating gases containing hydrocarbons, carbon monoxide and nitrogen oxides as in the case of internal combustion engine exhaust gases, to reduce pollution of the atmosphere. The simultaneous reduction of nitrogen oxides and oxidation of hydrocarbons and carbon monoxide may be conducted by using, for example, gaseous mixtures having a substantially stoichiometric ratio of molecular oxygen and fuel based on complete conversion to carbon dioxide and water.

One means of lowering the content of atmospheric pollutants in exhaust gases is by their contact with catalysts containing a catalytically-active, promoting metal component, especially a platinum group metal component. The catalysts are usually placed in the line leading from the source of the exhaust gases and serve to promote reaction between the polluting constituents of the gases and oxygen or hydrogen to convert the gases to less noxious materials. For example, the uncombusted and partially combusted fuel components in engine exhaust gases may be reacted with free oxygen, derived either from fuel-lean operation of the combustion zone or from an external air or other oxygen supply. In any event, the provision of the catalysts does entail considerable expense. The catalysts generally contain minor amounts of one or more catalytically-active metal components which are susceptible to poisoning or deactivation of their catalytic activity through contact with materials such as lead, zinc, other metals, sulfur, phosphorus and other substances which are present in the exhaust or other gases with which the catalysts come in contact over long periods of use at elevated temperatures. Poisoning destroys, or materially reduces the length of, the useful life of the catalysts which in order to be economically feasible and otherwise conveniently employed, must be used successfully for extended times. For example, it is most desired, if not required, that automobile exhaust-treating catalysts operate satisfactorily for at least 50,000 miles of vehicle travel.

The poisoning of the activity of the catalysts may be due, for example, to materials containing sulfur which is a naturally-occurring component of many hydrocarbon fuels. Other sources of catalyst poisons are fuel additives such as the lead in octane number-enhancing materials added to gasoline, for example, tetraethyl or tetramethyl lead. Although in the United States there are restrictions on the amount of lead that may be added to gasolines, even the small amounts of lead permitted, or present from various contaminating source, can cause undue poisoning of the catalysts over long periods of uses. Similarly, other fuel additives such as those containing phosphorus may lead to catalyst poisoning when exhaust gases derived from the oxidation of the fuel are contacted with the catalysts. Engine lubricating oils may be sources of catalyst poisons such as zinc, phosphorus or sulfate which ultimately may appear in the exhaust gases. Thus, to be satisfactory, the catalysts must be adequately resistant to the deleterious effects of these and other poisons.

By the present invention we have provided macrosize catalysts having good activity and catalytic stability, and increased resistance to poisoning from materials such as lead, zinc, other metals, sulfur or phosphorus with which the catalysts come in contact during use, for example, as described above. The macrosize catalysts contain a catalytically-effective amount of one or more catalytically-promoting metal components combined with a high surface area, catalytically-active, refractory oxide support. According to the invention the macrosize catalysts have alumina applied to their surfaces to provide protection against the poisoning effects of various materials. The amount of the surface-applied alumina is sufficient to increase the resistance of the catalysts to poisoning by one or more materials such as lead, zinc, other metals, sulfur, phosphorus and the like. Often the surface-applied alumina ($Al_2O_3$ basis) comprises a minor amount, say about 0.5 to 20%, of the total weight of the catalyst, and preferably this amount is about 2 to 10 percent. Apparently, the surface alumina acts as a sink or trap for the catalyst poisons to prevent them from unduly reacting with the catalytically-promoting metal component, but yet the activity of the catalyst is not unduly adversely affected, if at all.

The surface-applied alumina added to the catalysts of this invention contains catalytically-active alumina or a hydrous alumina precursor thereof, as an essential component. This active alumina component is of the high surface area-type, e.g., having a surface area of at least about 25, preferably at least about 100, square meters per gram as determined by the BET method, and is generally referred to as being catalytically-active. The active aluminas include the members of the gamma or activated alumina family, such as gamma and eta aluminas, as distinguished from relatively inactive, low surface area alpha-alumina. The surface-applied material may be a calcined or activated alumina, or a hydrous alumina which can be converted to a more active alumina by calcination, or use, at high temperatures, for instance, these more hydrous aluminas include amorphous hydrous alumina, alumina monohydrate, alumina trihydrate or their mixtures. These alumina materials may contain minor amounts of other components such as rare earth oxides, e.g., ceria, silica and the like. The alumina is preferably a major amount of the surface-applied material on a solids basis. Most desirably, the amount of alumina is at least about 75% of the total weight of the solids. If other ingredients are added to the catalyst after the surface-applied alumina component, it is preferred that they be essentially free of catalytically-active, promoting metal components, e.g., platinum group metals, or other promoters, of substantially greater catalytic activity than the surface-applied alumina component.

The compositions of this invention can be made by contacting the macrosize catalyst composite containing the catalytically-active promoting metal component and the high surface area support with a liquid slurry of the catalytically-active alumina, or a hydrous alumina precursor thereof, in the form of finely-divided solids, e.g., having particle sizes of less than about 20 mesh (Tyler). The catalyst composite is usually dried, and is preferably calcined say at temperatures of at least about 250° C., before contact with the slurry. The slurries often contain about 20 to 60 weight percent of solids, preferably about 30 to 50 weight percent. Most desirably, the essential liquid phase of the slurry is aqueous. After application of the slurry, the catalytic composite may be dried or calcined, preferably at temperatures of at least about 250° C., and such calcination may occur during use of the catalyst.

The catalytically-active promoting metal component of the catalysts of this invention may comprise one or more metals which may be in elemental or combined form as in the case of alloys, salts, oxides and the like. The metals are generally the heavy or transition metals of Groups III to VIII having an atomic weight of at least about 45. The metals include, for instance, the iron group metals, iron, nickel and cobalt; the metals of Groups VB and VIB, e.g., vanadium, chromium, molybdenum and tungsten; copper; zinc; manganese; rhenium; and combinations of such metals. The precious metals may also be in the catalysts as catalytically-active components, and it is quite preferred that one or more metals from the platinum group be present. The amount of promoting metal is generally a minor portion of the catalytic composite, and the amount is sufficient to provide a desired catalytically-promoting effect during the use of the catalyst. Such amounts may depend on the choice of metal and the intended use of the catalyst, and the amounts are generally at least about 0.01 weight % of the catalyst. These amounts may be up to about 30 or 40% or more, and preferably, the amounts are about 0.1 to 20%. In the case of the base or non-precious metals the amounts are frequently at least about 1% of the catalyst.

In the preferred catalysts of this invention, platinum group metal is present in the catalytically-active, promoting component in an amount sufficient to provide compositions having significantly enhanced catalytic activity due to the platinum group metal component. The useful platinum group metals include, for instance platinum, ruthenium, palladium, iridium and rhodium, and mixtures or alloys of such metals, e.g., platinum-palladium, platinum-rhodium, platinum-palladium-rhodium, may serve in the platinum group metal component of the catalysts. The amount of platinum group metal is a minor portion of the catalyst and generally does not materially exceed about 5 weight percent. For instance, the amount may be about 0.01 to 4% and is preferably about 0.03 to 1%. When the platinum group metal component of the catalysts contains more than one of such metals, this component may, for instance, be composed of a major amount of platinum and a minor amount of one or more of the other platinum group metals, e.g., one or both of palladium and rhodium. For example, this component of the catalyst may have about 55 to 98 weight % platinum and about 2 to 45 weight % of total platinum group metal other than platinum, e.g., total palladium and rhodium, based on the total of all of these metals. The platinum group metal may be present in the catalysts in elemental or combined forms, e.g., as an alloy, oxide, sulfide or the like. The foregoing amounts of the catalytically-promoting metals, whether they be base or previous metals, are stated on the basis of the metals regardless of their form.

Preferred platinum group metal-containing catalysts of this invention may contain both the platinum group metal component as aforedescribed and one or more base metal components. Such catalysts may be particularly useful in systems in which it is desired to conduct both oxidation and reduction simultaneously, for instance, to reduce nitrogen oxides while oxidizing carbon monoxide and hydrocarbons which may be present in the reaction system. The base metal component may be selected from those described above, and may particularly contain an iron group metal such as nickel, for instance, in oxide form. The amount of platinum group metal present may be as indicated above, while the base metal is often present in the catalyst in an amount greater than the platinum group metal, say at least about 0.5 weight % and up to about 20 weight % or more on an oxide basis. In such catalysts the weight ratio of base metal, oxide basis, to platinum group metal is generally at least about 2:1, preferably at least about 5:1, and preferably the catalysts contain more than one platinum group metal, particularly platinum plus one or more other platinum group metals, e.g., one or both of palladium and rhodium, in the amounts indicated above.

The high area support with which the catalytically-active, promoting metal component is combined in the catalysts of this invention, is comprised of one or more refractory oxides. These oxides include, for example, silica and metal oxides such as alumina, including metal oxide forms such as silica-alumina, aluminosilicates which may be amorphous or crystalline, alumina-zirconia, alumina-chromia, alumina-ceria and the like. Preferably, the support is composed to a major extent of alumina which especially includes the members of the gamma or activated alumina family, such as gamma and eta aluminas, and, if present, a minor amount of other refractory oxide, e.g., about 1 to 20 weight percent. The support materials which are in admixture with the catalytically-active, promoting metal component in the catalysts of this invention are often referred to as being in catalytically-active forms, but such activity is of a low order compared with that of the catalytically-active, promoting metal components. The high surface area supports generally comprise a major amount of the combined weight of the support and catalytically-active, promoting metal. The surface area of the support is relatively high, usually at least about 25 square meters per gram as determined by the BET method, preferably at least about 100 square meters per gram.

The catalysts of this invention to which the alumina is applied to impart the desired resistance to the effect of materials which would otherwise poison the catalysts to a greater extent, are in macrosize form. Generally, macrosize catalysts have minimum dimensions of at least about 1/16 inch, and often at least one or all dimensions are at least about ⅛ inch. The catalysts may be in particle form such as spheres, cubes, elongated pellets or the like, but preferably are in the form of monolithic or unitary structures having a plurality of gas flow paths through a single piece of catalyst.

The catalysts of the invention may have a carrier component which is relatively catalytically-inert compared with the high surface area support, and the carrier is generally of considerably lower total surface area than the support which is applied thereto. Thus, the carrier may have a total surface area of less than about 5 or 10 square meters per gram, more often less than about 1 square meter per gram, as determined by the BET method. The carrier may be in macrosize particle form before the more catalytically-active materials are added, and preferably the carrier is in monolithic form, e.g., a honeycomb configuration. The high area support material is generally distributed as a coating over most, if not all, of the surface of the carrier, and usually the high surface area support material is present in these catalysts in a minor amount based on the weight of the catalyst, say about 5 to 35, preferably about 10 to 30, weight percent. The carrier is often the major amount of these catalysts.

The relatively inert carriers of the catalysts of this invention may be made of one or more of a variety of materials, but preferably are composed primarily of one or more refractory oxides or other ceramics or metals. The preferred carriers are comprised of cordierite, cordierite-alpha alumina, silicon nitride, zircon mullite, spodumene, alumina-silica-magnesia or zorconium silicate. Examples of other refractory ceramic materials utilizable in place of the preferred materials as a carrier are sillimanite, magnesium silicates, zircon, petalite, alpha-alumina and aluminosilicates. Although the carrier may be a glass ceramic, it is preferably unglazed and may be essentially entirely crystalline in form and marked by the absence of any significant amount of glassy of amorphous matrices, for instance of the type found in porcelain materials. Further, the structure may have considerable accessible porosity as distinguished from the substantially non-porous porcelain utilized for electrical applications, for instance in spark plugs, characterized by having relatively little accessible porosity. Thus, the carrier structure may have a water pore volume of at least about 10 weight percent. Such carriers are described, for example, in U.S. Pat. No. 3,565,830, herein incorporated by reference.

The monolithic carriers of the catalysts of this invention are of the type that have a plurality of passages through a single piece of the carrier. The passages are open to fluid flow and thus are not blocked or sealed against flow from an inlet to a separate outlet, and, accordingly, the passages are not merely surface pores. The passages are generally rather large compared with the size of surface pores in order that the fluids going through the passages are not subject to excessive pressure drop. The monolithic catalyst carriers have a unitary, skeletal structure of macrosize with a minimum cross-sectional dimension generally perpendicular to the direction of fluid flow therethrough of, for instance, at least about 2 centimeters, e.g. in honeycomb form, and have flow path lengths of at least about 5 centimeters, preferably at least about 10 centimeters.

The flow passages of the monolithic carrier may be thin-walled channels providing a relatively large amount of superficial surface area. The channels can be one or more of a variety of cross-sectional shapes and sizes. The channels can be of the cross-sectional shape of, for example, a triangle, trapezoid, rectangle, polygon of more than four sides, square, sinusoid, oval or circle, so that cross-sections of the carrier represent a repeating pattern that can be described as a honeycomb, corrugated or lattice structure. The walls of the cellular channels are generally of a thickness necessary to provide a sufficiently strong unitary body, and the thickness will often fall in the range of about 2 to 25 mils. With this wall thickness, the structures may contain from about 100 to 2500 or more gas inlet openings for the flow channels per square inch of cross-section and a corresponding number of the gas flow channels, preferably about 150 to 500 gas inlets and flow channels per square inch. The open area of the cross-section may be in excess of about 60% of the total area.

The catalysts of this invention can be made by various suitable procedures. The catalytically-active, promoting metal component can be combined with the high area support in macrosize form or in finely divided form with the mixture being subsequently formed into macrosize. The mixture may instead be deposited on a carrier. Also, the catalytically-active, promoting metal component may be incorporated in the high area support after the latter is deposited on a carrier. The catalytically-active, promoting metal component may be added as a solution, e.g., choroplatinic acid, and the composite dried. The catalytically-active, promoting metal component may be fixed on the high area support, e.g., by treatment with hydrogen sulfide or by other means, and after fixing the catalytically-active, promoting metal component may be in water-insoluble form. During preparation or subsequent use of the catalysts, the catalytically-active, promoting metal component may be converted to elemental form by treatment with hydrogen-containing gas. Generally, the composited catalytically-active, promoting metal component and high area support, whether on a carrier or not, will be dried or calcined before the protective surface-applied alumina is added, and preferably the composite is calcined prior to addition of the surface-applied alumina. Calcination can be conducted at elevated temperatures, e.g., of the order of at least about 250° C., preferably at least about 475° C., but not so high as to destroy the high area of the support. After the surface-applied alumina is added the catalysts may be dried, and are preferably calcined at temperatures of at least about 250° C., but not so high as to unduly destroy the surface area of the surface-applied alumina.

As stated above, the catalysts of the present invention can be employed to promote the oxidation or reduction of various chemical feedstocks or exhaust effluents, as noted above. Although such reactions may occur at relatively low temperatures, they are often conducted at elevated temperatures of, for instance, at least about 150° C., preferably about 200° to 900° C., and generally with the reactants in the vapor phase. The materials which are subject to oxidation generally contain carbon, and may, therefore, be termed carbonaceous, whether they are organic or inorganic in nature. The catalysts are thus useful in promoting, for example, the oxidation of hydrocarbons, oxygen-containing organic components, carbon monoxide, and the reduction of nitrogen oxides. These types of materials may be present in exhaust gases from the combustion of carbonaceous fuels, and the catalysts of the present invention are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The present invention will be illustrated further by the following examples. All parts and percentages are by weight unless otherwise indicated.

EXAMPLE I

A stabilized $CeO_2.Al_2O_3$ slip is prepared by dissolving 336 grams $Ce(NO_3)_3.6H_2O$ in 1188 ml. $H_2O$ for a final volume of solution of about 1390 ml. 1200 Grams of activated $Al_2O_3$ powder is stirred into the solution which is dried with constant agitation, transferred to a drying oven at 110° C., and dried for 17 hours. The dried solids are ground to less than 40 mesh (Tyler) and calcined at 1100° C. for 1 hour. 1000 Grams of this calcined powder are mixed with 1000 ml. $H_2O$ and 20.1 ml. conc. $HNO_3$, and ball-milled for 17 hours at 68 RPM in a U.S. Stoneware 1-gallon mill jar. 1000 Parts of the resulting slip are diluted with a solution of 3.3 parts conc. $HMO_3$ and 333 parts $H_2O$. A 3 cubic inch cordierite honeycomb having about 250 parallel gas passages per square inch of cross-sectional area, is dipped into this diluted slip, blown, with air, dried at 110° C. for 2 hours, and calcined at 500° C. for 2 hours. Approximately 15 wt.% of total ceria and alumina adheres to the honeycomb based on the weight of the latter. Platinum is deposited on the ceria and alumina-coated honeycomb by immersion in 500 ml. of aqueous $H_2PtCl_6$ (containing 2.41 g. Pt) for 30 minutes and then treated with $H_2S$ for 20 minutes. After being washed chloride free and dried, the honeycomb is heated in an air atmosphere for about 1 hour to reach 500° C. and then maintained at 500° C. for 2 hours.

EXAMPLE II

A composition of the present invention can be made by contacting the calcined platinum-containing catalyst prepared essentially as described in Example I with an aqueous dispersion of activated, gamma-type alumina, for instance, a stabilized $CeO_2$-$Al_2O_3$ slip such as that employed in Example I to initially coat the cordierite honeycomb. The $CeO_2.Al_2O_3$ can be added to the platinum-containing catalyst by dipping the latter into the stabilized $CeO_2.Al_2O_3$ slip. The honeycomb is then withdrawn from the slip and blown with air to leave a coating of the slip on the platinum-containing catalyst. The resulting material is then dried at 110° C. for 2 hours and calcined at 500° C. for 2 hours. If necessary, the dipping, blowing, drying and calcining procedure can be repeated until the desired amount of $CeO_2.Al_2O_3$ is added to the surface of the platinum-$CeO_2.Al_2O_3$-honeycomb catalyst.

EXAMPLE III

Three compositions of the invention were prepared in the manner described in Example II and they contained about 1.5% (Catalyst A), about 2.8% (Catalyst B), and about 5.2% (Catalyst C), respectively, of the $CeO_2.Al_2O_3$ added to the platinum-$CeO_2.Al_2O_3$-honeycomb composite. The percentages are based on the total weight of the honeycomb and the promoting metal component. The catalysts were aged by treatment with steam for 24 hours at 1800° F. To illustrate that the aged catalysts promote the oxidation of hydrocarbons and carbon monoxide in automobile exhaust gas, the gas is passed in contact with a given catalyst at 100,000 volume hourly space velocity at various temperatures. Typically such gas contains 3.0% oxygen, 1.0% carbon monoxide, 300 ppm. ethylene, 10.0% carbon dioxide, 500 ppm. nitric oxide and the remainder nitrogen. The gas is preheated upstream of the catalyst to raise the catalyst temperature to a given level and the gaseous effluent at each temperature tested is analyzed for carbon monoxide and ethylene contents. These values are plotted against the oxidation temperature as measured about ¼" upstream of the catalyst. From a plot of oxidation temperature against the amounts of carbon monoxide and ethylene in the effluent, the temperatures required for a given conversion of carbon monoxide to carbon dioxide and for a given conversion of ethylene to carbon dioxide and water are determined. These values are reported in Table I below as are the results obtained when testing the same catalyst (Catalyst D) having no $CeO_2.Al_2O_3$ added to its surface.

TABLE I

| | Temperature For Conversion, °C. | | | | | |
| | 50% | | 75% | | 90% | |
| Catalyst | CO | $C_2H_4$ | CO | $C_2H_4$ | CO | $C_2H_4$ |
|---|---|---|---|---|---|---|
| A | 260 | 280 | 280 | 365 | 320 | 500 |
| B | 240 | 240 | 240 | 240 | 240 | 250 |
| C | 240 | 240 | 240 | 260 | 260 | 300 |
| D | 260 | 330 | 300 | 415 | 400 | 600 |

EXAMPLE IV

Catalysts B and C of Example III were tested to show their resistance to lead poisoning and the performance of these catalysts was compared with that of a similar catalyst (Catalyst D) except that the latter catalyst did not have a $CeO_2.Al_2O_3$ coating applied to the platinum- $CeO_2.Al_2O_3$-honeycomb composite. In this test the efficiency of the catalyst for oxidizing CO and hydrocarbons present in spark-ignition engine exhaust gases is determined by a standard test procedure using "lead-free" gasoline. Then the catalyst is used for the equivalent of 20 gallons of operation on leaded gasoline in a commercial vehicle, after which its performance is again evaluated by the standard test procedure. The results of these tests are reported in Table II.

TABLE II

| Catalyst | CO Conversion Efficiency %* | | | Hydrocarbon Conversion Efficiency %* | | |
|---|---|---|---|---|---|---|
|  | Steady 30 | State 40 | MPH 50 | Steady 30 | State 40 | MPH 50 |
| B | 99 | 84 | 83.3 | 79.2 | 93 | 87.7 |
| C | 99.3 | 89.5 | 89.2 | 82.3 | 94.6 | 94.6 |
| D | 99.3 | 88 | 87.5 | 82.3 | 93 | 90 |

*% of catalyst performance before lead poisoning.

These tests show that Catalyst C of the present invention which had 5.2% $CeO_2.Al_2O_3$ added to the platinum-$CeO_2.Al_2O_3$-honeycomb catalyst exhibited a marked improvement in resistance to lead poisoning compared with the same catalyst, Catalyst D, having no $CeO_2.Al_2O_3$ added to the surface of the catalyst. Apparently, Catalyst B had insufficient surface addition of the $CeO_2.Al_2O_3$ to provide an improvement, at least when evaluated by this procedure.

EXAMPLE V

Other tests were conducted using a catalyst similar to Catalyst C of Example III containing a protective $CeO_2.Al_2O_3$ coating of approximately 5% based on the total weight of the honeycomb and the promoting metal component, and a similar catalyst having no $CeO_2.Al_2O_3$ added to the surface of the catalyst (Catalyst D). In these tests, the ability of the catalysts to oxidize CO and hydrocarbons in automobile engine exhaust gases over a long period of time was determined. The engine was operated on gasoline containing about 0.035 grams of lead per gallon of gasoline. The performance of Catalysts C and D was evaluated as virgin catalysts and after use in the engine for the equivalent of 5,404; 10,181; and 20,189 miles. The results appear in Table III below.

TABLE III

| Catalyst | Miles | Temperature For Conversion, °C. | | | | | |
|---|---|---|---|---|---|---|---|
|  |  | 50% | | 75% | | 90% | |
|  |  | CO | $C_2H_4$ | CO | $C_2H_4$ | CO | $C_2H_4$ |
| C | 0 | 220 | 220 | 220 | 220 | 220 | 220 |
| C | 5,404 | 240 | 240 | 245 | 250 | 245 | 295 |
| C | 10,181 | 240 | 245 | 245 | 300 | 255 | 490 |
| C | 20,189 | — | 250 | — | 335 | — | 555 |
| D | 0 | 225 | 220 | 225 | 220 | 235 | 230 |
| D | 5,404 | 235 | 240 | 235 | 260 | 245 | 365 |
| D | 10,181 | — | 240 | — | 350 | — | 545 |
| D | 20,189 | 250 | 250 | 250 | 475 | 255 | 575 |

The data of Table III show that the deposition of the alumina-containing material on the surface of the catalyst improved its resistance to lead poisoning with the improvement being greater after long periods of use and at higher conversion levels.

EXAMPLE VI

A porous coating is applied to a monolithic, honeycomb carrier of cordierite-mullite made by the Technical Ceramics Products Divisions of the 3M Company (AlSi Mag ® 795), by immersion of the carrier in a 40–45% by weight aqueous slurry of activated alumina stabilized by 10% ceria. Excess slurry is blown off the coated carrier by compressed air, and the resulting piece is dried at 125° C. to remove free water, and calcined at 500° C. The coated carrier is then impregnated with nickel by immersion in a 50 weight percent aqueous solution of nickel nitrate (500 g/liter). Excess solution is blown off by air, and the composite is then dried at 125° C. and calcined at 500° C. to produce about 2 weight percent of nickel oxide coating. The nickel oxide-containing composite is then impregnated with an aqueous solution having 7 grams of chloroplatinic acid and 0.6 grams of rhodium trichloride per liter of water. The wet, monolithic composite is placed in a chamber, evacuated, and treated with hydrogen sulfide at room temperature to fix the precious metals in place. The impregnated monolith is then washed free of chloride by contact with deionized water, dried at 125° C., and calcined at 500° C. to yield a finished polyfunctional catalyst containing 0.2 weight percent Pt, 0.011 weight percent Rh, and 2.0 weight percent $Ni_2O_3$.

EXAMPLE VII

A porous coating is applied to a monolithic, honeycomb carrier of cordierite-mullite of the same type used in Example VI, by immersion of the carrier in a 40–45% by weight aqueous slurry of activated alumina stabilized by 10% ceria. Excess slurry is blown off the coated carrier by compressed air, and the resulting piece is dried at 125° C. to remove free water, and calcined at 500° C. The coated carrier is then impregnated simultaneously with nickel, platinum, and rhodium by immersion in an aqueous solution having 500 grams of nickel nitrate, 7.5 grams of chloroplatinic acid and 0.53 grams rhodium trichloride per liter. Excess solution is blown off by air, and the resulting wet composite is placed in a chamber, evacuated, and treated with hydrogen sulfide at room temperature to fix the precious metals in place. The composite is then washed free of chloride by contact with deionized water, dried at 125° C., and calcined at 650° C. to yield a finished polyfunctional catalyst containing 0.23 weight percent Pt, 0.011 weight percent Rh, and 2.0 weight percent $Ni_2O_3$.

EXAMPLES VIII AND IX

A monolithic, honeycomb catalyst containing 0.17 weight % platinum, 0.012 weight % rhodium, and 1.15 weight % nickel oxide ($Ni_2O_3$ basis), impregnated in a ceria-activated alumina coating (2.2 weight % $CeO_2$ and 19.9 weight % $Al_2O_3$ based on the catalyst) on the carrier is coated with about 4.4 weight % of $CeO_2$. activated $Al_2O_3$ (about 10% $CeO_2$), dried and calcined essentially as described in Example II to provide Catalyst E. Another similar catalyst contains 0.17 weight % platinum, 0.009 weight % rhodium, 1.44 weight % nickel oxide, 2.63 weight % $CeO_2$ and 23.7 weight % $Al_2O_3$. A coating of $CeO_2$. activated $Al_2O_3$ (about 10% $CeO_2$) is deposited on the catalyst in an amount of about 8.5 weight %, and the resulting composite is dried and calcined essentially as described in Example II to provide Catalyst F.

Catalysts E and F are used to convert a gaseous feed made by mixing its separate components in ratios simulating a spark-ignition, internal combustion engine exhaust gas. This feed is combined with differing amounts of air in several tests, and the extents of conversion of nitrogen oxides, carbon monoxide and hydrocarbons are determined at both 500° C. The results from these tests are as follows:

TABLE IV

| Catalyst | Temp. °C. | Air/Fuel Wt. Ratio | Wt. % Conversion | | | Wt. % NH₃** |
|---|---|---|---|---|---|---|
| | | | NOx | CO | HC | |
| E | 500 | 14.2 | 90 | 44 | 7 | 10 |
| | | 14.5* | 93 | 80 | 16 | 0 |
| | | 14.7 | 28 | 98 | 71 | — |
| | | 14.9 | 0 | 98 | 66 | — |
| | | 15.1 | 0 | 98 | 62 | — |
| E | 650 | 14.2 | 93 | 44 | 12 | 29 |
| | | 14.5 | 94 | 74 | 30 | 10 |
| | | 14.7 | 34 | 98 | 81 | — |
| | | 14.9 | 0 | 99 | 87 | — |
| | | 15.1 | 0 | 98 | 92 | — |
| F | 500 | 14.2 | 51 | 23 | 6 | 37 |
| | | 14.5 | 72 | 67 | 14 | 15 |
| | | 14.7 | 54 | 98 | 58 | — |
| | | 14.9 | 1 | 98 | 67 | — |
| | | 15.1 | 0 | 98 | 59 | — |
| F | 650 | 14.2 | 78 | 27 | 15 | 15 |
| | | 14.5 | 86 | 70 | 32 | 6 |
| | | 14.7 | 58 | 98 | 68 | 0 |
| | | 14.9 | 0 | 99 | 88 | — |
| | | 15.1 | 0 | 98 | 83 | — |

*Approximate stoichiometric air/fuel ratio.
**Yield of ammonia based on converted nitrogen oxides (NOx).

Catalysts E and F exhibit higher activity upon aging than similar catalysts having no added ceria-alumina coating on the platinum, rhodium and nickel oxide-containing catalysts.

It is claimed:

1. In a process of preparing a macrosize catalytic composition suitable for use in the oxidation of carbonaceous materials, and/or the reduction of nitrogen oxides, the steps which comprise depositing an aqueous slurry of particles of a major amount of catalytically-active alumina or a hydrous alumina precursor thereof and a minor amount of one or more rare earth oxides, on the surface of a macrosize catalyst consisting essentially of a catalytically-effective amount of catalytically-active promoting metal component and high area, refractory oxide support, the promoting metal being susceptible to poisoning by extraneous materials and the amount of said deposit being sufficient to increase the resistance of the catalyst to poisoning by extraneous materials, and drying said composition subsequent to said deposition.

2. A process of claim 1 in which the amount of said catalytically-active alumina or a hydrous alumina precursor thereof deposited on the catalyst is about 2 to 10 weight %, as alumina, of said catalytic composition.

3. A process of claim 1 in which said refractory oxide support comprises catalytically-active alumina.

4. A process of claim 1 in which said promoting metal component comprises platinum group metal.

5. A process of claim 4 in which said refractory oxide support comprises catalytically-active alumina.

6. A process of claim 5 in which the amount of said catalytically-active alumina deposited on the catalyst is about 2 to 10 weight % as alumina, of said catalytic composition.

7. A process of claim 1 in which said catalyst contains base metal oxide and platinum group metal in a weight ratio of at least about 5:1, and the platinum group metal comprises a major amount of platinum and a minor amount of other platinum group metal.

8. A process of claim 7 in which said catalyst contains about 0.5 to 20 weight % nickel oxide and about 0.03 to 1 weight % of the metals platinum plus one or both of palladium and rhodium.

9. In a process of preparing a macrosize catalytic composition suitable for use in the oxidation of carbonaceous materials, and/or the reduction of nitrogen oxides, the steps which comprise depositing an aqueous slurry of particles of a major amount of a catalytically-active alumina or a hydrous alumina precursor thereof and a minor amount of one or more rare earth oxides, on the surface of a macrosize catalyst consisting essentially of a catalytically-effective amount of catalytically-active promoting metal component, high area, refractory oxide support and relatively catalytically-inactive carrier, the promoting metal component being susceptible to poisoning by extraneous materials and the amount of said deposit being sufficient to increase the resistance of the catalyst to poisoning by extraneous materials, and drying said composition subsequent to said deposition.

10. A process of claim 9 in which said carrier comprises a ceramic structure having fluid flow passages therethrough.

11. A process of claim 10 in which the amount of said particles of catalytically-active alumina or a hydrous alumina precursor thereof and rare earth oxides deposited on the catalyst is about 2 to 10 weight %, as alumina, of said catalytic composition.

12. A process of claim 11 in which said refractory oxide support comprises catalytically-active alumina.

13. A process of claim 11 in which said promoting metal component comprises platinum group metal.

14. A process of claim 13 in which said refractory oxide support comprises catalytically-active alumina.

15. A process of claim 14 in which the amount of said particles of catalytically-active alumina and rare earth oxides deposited on the catalyst is about 2 to 10 weight %, as alumina, of said catalytic composition.

16. A process of claim 9 in which said catalyst contains base metal oxide and platinum group metal in a weight ratio of at least about 5:1, and the platinum group metal comprises a major amount of platinum and a minor amount of other platinum group metal.

17. A process of claim 16 in which said catalyst contains about 0.5 to 20 weight % nickel oxide and about 0.03 to 1 weight % of the metals platinum plus one or both of palladium and rhodium.

18. A macrosize catalyst composition suitable for use in the oxidation of carbonaceous materials, and/or the reduction of nitrogen oxides, consisting essentially of a catalytically-effective amount of catalytically-active, promoting metal component susceptible to poisoning by extraneous materials and high area, refractory oxide support, said macrosize catalyst composition having deposited on the surface thereof the dried residue of an aqueous slurry of particles of a major amount of catalytically-active alumina or a hydrous alumina precursor thereof and a minor amount of one or more rare earth oxides, in an amount sufficient to increase the resistance of the catalyst to poisoning by extraneous materials.

19. A composition of claim 18 in which said catalytically-active alumina or a hydrous alumina precursor thereof, is deposited on the catalyst in the amount of about 2 to 10 weight %, as alumina, of said catalyst composition.

20. A composition of claim 18 in which said refractory oxide support comprises catalytically-active alumina.

21. A composition of claim 18 in which said promoting metal component comprises platinum group metal.

22. A composition of claim 21 in which said refractory oxide support comprises catalytically-active alumina.

23. A composition of claim 22 in which said catalytically-active alumina is deposited on said catalyst in the amount of about 2 to 10 weight %, as alumina, of said catalyst composition.

24. A composition of claim 18 which contains base metal oxide and platinum group metal in a weight ratio of at least about 5:1, and the platinum group metal comprises a major amount of platinum and a minor amount of other platinum group metal.

25. A composition of claim 24 which contains about 0.5 to 20 weight % nickel oxide and about 0.03 to 1 weight % of the metals platinum plus one or both of palladium and rhodium.

26. A macrosize catalyst composition suitable for use in the oxidation of carbonaceous materials, and/or the reduction of nitrogen oxides, consisting essentially of a catalytically-effective amount of catalytically-active, promoting metal component susceptible to poisoning by extraneous materials and high area, refractory oxide support on a relatively catalytically-inactive carrier, said macrosize catalyst composition having deposited on the surface thereof the dried residue of an aqueous slurry of particles of a major amount of catalytically-active alumina or a hydrous alumina precursor thereof and a minor amount of one or more rare earth oxides, in an amount sufficient to increase the resistance of the catalyst to poisoning by extraneous materials.

27. A composition of claim 26 in which said carrier comprises a ceramic structure having fluid flow passages therethrough.

28. A composition of claim 27 in which said catalytically-active alumina or a hydrous alumina precursor thereof and rare earth oxides, is deposited on the catalyst in the amount of about 2 to 10 weight %, as alumina, of said catalyst composition.

29. A composition of claim 27 in which said refractory oxide support comprises catalytically-active alumina.

30. A composition of claim 27 in which said promoting metal component comprises platinum group metal.

31. A composition of claim 30 in which said refractory oxide support comprises a major proportion of a catalytically-active alumina and a minor proportion of ceria.

32. A composition of claim 31 in which said catalytically-active alumina and ceria is deposited on the catalyst in the amount of about 2 to 10 weight %, as alumina, of said catalyst composition.

33. A composition of claim 26 which contains base metal oxide and platinum group metal in a weight ratio of at least about 5:1, and the platinum group metal comprises a major amount of platinum and a minor amount of other platinum group metal.

34. A composition of claim 33 which contains about 0.5 to 20 weight % nickel oxide and about 0.03 to 1 weight % of the metals platinum plus one or both of palladium and rhodium.

* * * * *

UNITED STATES PATENT AND TRADEMARK OFFICE
CERTIFICATE OF CORRECTION

PATENT NO. : 4,206,087
DATED : Jun. 3, 1980
INVENTOR(S) : Carl D. Keith, John J. Mooney, Robert E. Kenson, Daniel L. Bair It is certified that error appears in the above-identified patent and that said Letters Patent are hereby corrected as shown below:

In Column 4, line 38, change "previous" to --precious--.

In Column 5, line 64, change "of" in the first occurrence to --or--.

In Column 6, line 53, change "choroplatinic" to --chlorplatinic--.

In Column 7, line 54, change "$HMO_3$" to --$HNO_3$--.

In Column 11, Table IV, in the vacant space at the end of the thirteenth line in the Table "14.7    54    98    58", under the heading "$NH_3$", insert --0--.

Signed and Sealed this

Tenth Day of November 1981

[SEAL]

Attest:

GERALD J. MOSSINGHOFF

Attesting Officer    Commissioner of Patents and Trademarks